Patented Aug. 17, 1948

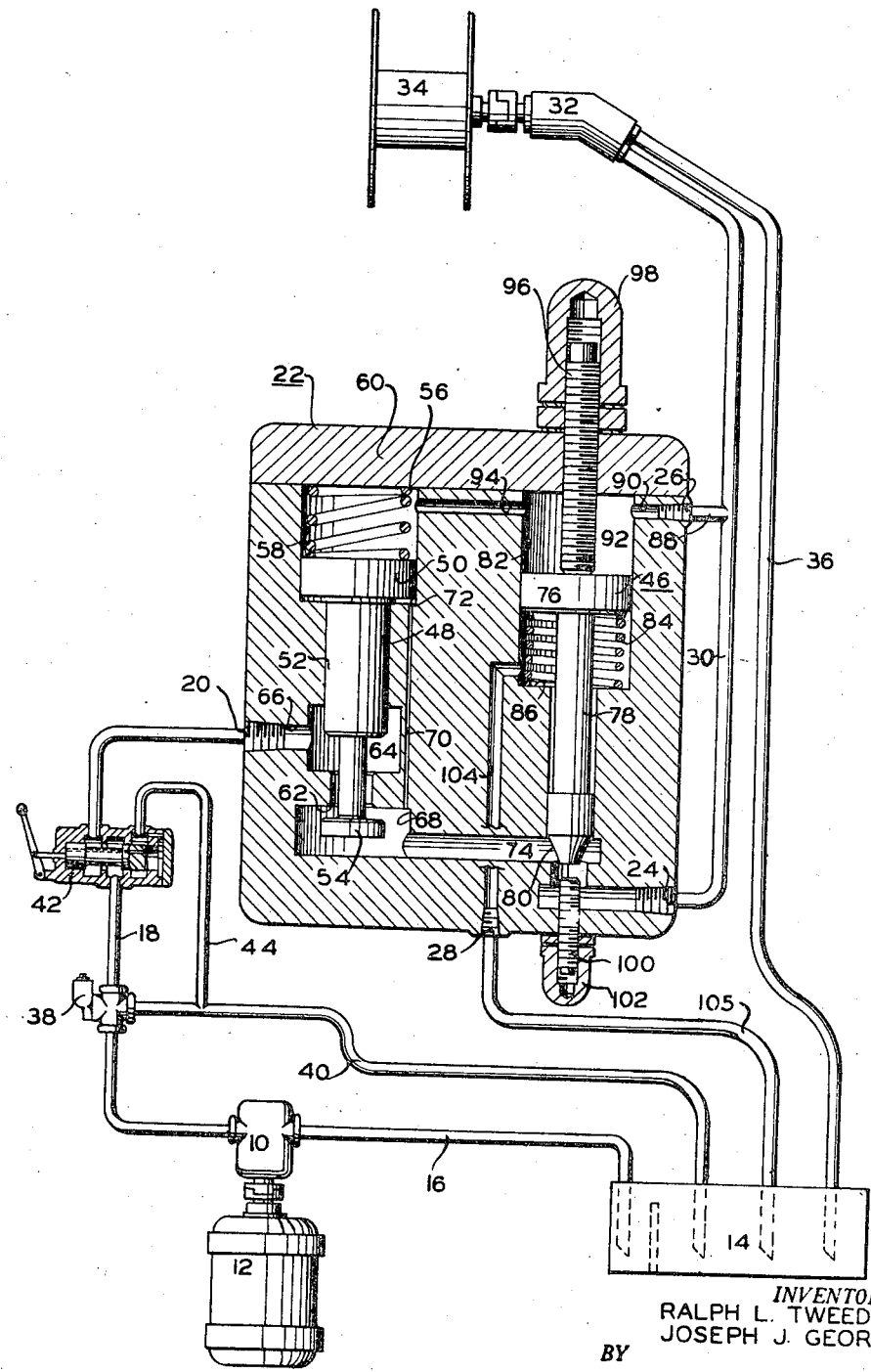

2,447,442

UNITED STATES PATENT OFFICE 2,447,442

HYDRAULIC POWER TRANSMISSION WITH FLOW CONTROL VALVE

Ralph L. Tweedale, Birmingham, and Joseph J. George, Wyandotte, Mich., assignors to Vickers Incorporated, Detroit, Mich., a corporation of Michigan Application December 26, 1944, Serial No. 569,829

8 Claims. (Cl. 60—53)

This invention relates to power transmissions, particularly to those of the type comprising two or more fluid pressure energy translating devices, one of which may function as a pump and another as a fluid motor.

The invention is particularly adapted for use with a reeling device and has been illustrated as applied to a mechanism of this character although it will be understood that the invention is equally adaptable to other applications.

In reeling devices wherein a strip of material is wound upon a reel in successive layers, the diameter of the reeled material progressively increases as the material is wound on the reel. If the material is fed to the reel at a constant speed, the speed of the reel must be decreased as the diameter of the reeled material increases, and likewise a progressively increasing torque must be applied to the reel as the diameter of the winding material on the reel increases.

In a hydraulic transmission for driving a reel comprising a fixed displacement pump and motor driving the reel, the pressure and volume should be a constant. As the material being wound upon the reel increases in diameter and the pressure rises due to an increase in torque at the motor, the volume of fluid to the motor driving the reel should decrease, not along a straight-line relation but by a hyperbolic relation.

It is an object of the present invention to provide a power transmission and control therefor which will operate to maintain a constant tension on a strip of material being wound on a reel and maintain a constant peripheral speed on the reeled material automatically in accordance with the load on the transmission.

It is also an object of the present invention to provide a flow regulating device for a hydraulic power transmission preferably containing a fixed displacement pump and motor, but which may contain variable types, which will automatically vary the output speed of the transmission, causing a decrease in speed of the driving motor in response to an increase in torque thereof as the diameter of the material being wound on the reel increases.

It is a further object of the present invention to provide a flow regulating device for use in a hydraulic power transmission, as above mentioned, which will operate to maintain constant uniform tension upon the material being reeled and which is operable over a wide range of speeds and reel diameters and which avoids the use of mechanism in contact with or associated with the reel or the strip material to determine the tension.

It is also an object of this invention to provide a pressure responsive, flow regulating valve device for a hydraulic transmission for driving a reel or other load device containing a fluid pump and motor which will automatically change the speed of the motor driving the reel or load device in response to changes in torque.

It is a further object of this invention to provide a simple and economically constructed flow regulating device for use in a hydraulic power transmission, containing a fluid pump and motor driving a reel or other load device, which is responsive directly to pressure developed in the transmission fluid and which automatically controls the speed of the motor driving the reel or other load device.

Further objects and advantages of the present invention will be apparent from the following description, reference being had to the accompanying drawing wherein a preferred form of the present invention is clearly shown.

In the drawing the single figure shown is a diagrammatic view of a power transmission system incorporating a preferred form of the present invention.

Referring now to the single figure, there is illustrated a pump 10, preferably of the fixed displacement type, which may be driven by an electric motor 12. The pump 10 withdraws fluid from a tank 14 by means of a suction conduit 16 and delivers fluid by means of a delivery conduit 18 to an inlet port 20 of a flow regulating device 22 which also has an outlet port 24, a control port 26 and a drain port 28. A conduit 30 connects the outlet port 24 of valve 22 to a motor 32 used for the purpose of driving a reel 34 upon which a strip of material will be wound. Fluid from motor 32 is returned to tank 14 by means of a conduit 36.

Incorporated in the pump delivery conduit 18 is a suitable pressure responsive relief valve 38 which will relieve excessive fluid, over a predetermined pressure, to tank 14 by means of an exhaust conduit 40. Also incorporated in pump delivery conduit 18 is a suitable three-way valve 42 which is used for the purpose of starting and stopping motor 32. In one position, valve 42 will direct fluid from pump 10 to the inlet port 20 of valve 22 from which it will be directed by means of conduit 30 to start motor 32, and in another position will direct fluid to tank 14 by connecting pump delivery conduit 18 and a conduit 44 which is connected to conduit 40, thereby completely bypassing motor 32, unloading pump 10, and stopping motor 32.

Flow regulating valve 22 is comprised of a housing containing a pressure responsive throttle 46 and a hydrostatic throttle valve 48 in series with throttle 46. Valve 48 is comprised of a piston 50 connected to which is a stem 52 at the other end of which is a poppet valve 54. A coil spring 56 of predetermined resistance located within a spring chamber 58 and abutting the upper side of piston 50 and the inner side of an end cap 60 of valve 22, the space between which forms chamber 58, normally unseats valve 54 from a valve seat 62. An inlet chamber 64 of valve 48 is in direct communication with inlet port 20 of valve 22 by means of a passageway 66 and is also in communication with a chamber 68 located within the housing of valve 22 when poppet valve 54 is unseated.

A passageway 70 is in open communication with chamber 68 and a chamber 72 on the underside of piston 50 so as to make piston 50 responsive to pressure changes within chamber 68 and thus seat or unseat inlet valve 54. A passageway 74 within the housing of valve 22 connects chamber 68 of valve 48 with throttle valve 46.

Throttle valve 46 is comprised of a piston 76 connected to which is a stem 78 at the other end of which is a tapered metering valve 80. Valve 46 is positioned and shiftable within a stepped bore 82 formed within the housing of valve 22. A coil spring 84 of predetermined tension abutting the underside of piston 76 is located in a lower chamber 86 formed by piston 76 and bore 82.

A conduit 88 connects conduit 30 to the control port 26 of valve 22, and a passageway 90 connects control port 26 to an upper chamber 92 of valve 46 formed in bore 82 between the upper side of piston 76 and end cap 60. A passageway 94 connects upper chamber 92 of valve 46 with upper chamber 58 of valve 48 so as to make both valve 46 and valve 48 responsive to pressure at motor 32.

The valve 80 is originally positioned to permit a maximum flow through passageway 74 at the start of a winding operation, depending upon the diameter of reel 34, by means of an adjustable screw 96 threaded through end cap 60 and abutting the upper side of piston 76. A protective cap 98 is threaded over the adjustable screw 96. Valve 80 is prevented from completely closing and blocking passageway 74 by means of an adjustable set screw 100 over which is threaded a protective cap 102.

Any seepage of fluid from chamber 92 of valve 46 past piston 76 which would tend to disturb the effective operation thereof is drained to tank 14 by means of a passageway 104 in open communication with chamber 86 and drain port 28, and a conduit 105 which connects port 28 to tank 14.

In operation, with the pump 10 running and with valve 42 shifted to open communication between delivery conduit 18 and inlet port 20 of valve 22 and blocking communication between delivery conduit 18 and conduit 44, fluid is delivered from pump 10 to the inlet port 20 of valve 22 by delivery conduit 18, and thence to motor 32 by passageway 66, inlet chamber 64, seat 62, chamber 68, passageway 74, metering valve 80, outlet port 24 and conduit 30. Fluid pressure in conduit 30 is low because the radius of the strip of material on the reel 34 is small, creating a low torque, and fluid motor 32 is operating reel 34 at the highest possible speed, its displacement being such as to cause the peripheral speed of the reel to be of the same value as the speed of the winding strip of material.

The pressure from chamber 68 of valve 48 acts on the underside of piston 50 by means of passageway 70 which connects chamber 68 and chamber 72. The pressure from motor 32 also acts in chamber 92 of valve 46 on the upper side of piston 76 and on the upper side of piston 50 of valve 48 by means of conduit 88, motor port 26 and passageways 90 and 94.

The purpose of valve 48 is to maintain a uniform constant pressure drop across the throttle 46 for any given position of the throttle. If the pressure drop across throttle 46 is at any time greater or less than the resistance of spring 56, as applied over the area of piston 50, inlet valve 54 will tend to close or open, respectively, so as to reduce or increase, respectively, the pressure drop across throttle 46, thus tending to maintain it constant. Thus, the rate of flow through throttle 46 is dependent only upon the degree of its opening.

Spring 84 of valve 46 originally positions valve 80 in passageway 74 so as to permit a maximum flow of fluid from pump 10 through passageway 74 to outlet port 24 of valve 22, when the strip of material is just beginning to be wound upon reel 34. Valve 80 will gradually close passageway 74 in response to an increase in pressure at motor 32 so as to decrease the volume of fluid going to motor 32 and thus decrease its speed as the winding strip of material increases in diameter on reel 34.

As the winding strip of material increases in diameter on reel 34 causing an increase in torque at motor 32 which causes an increase in pressure at motor 32, this increase in pressure reacts on the upper side of piston 76 tending to close valve 80 against the predetermined resistance offered by spring 84. As valve 80 gradually closes, the excess of pump delivery over motor consumption will be conducted to tank 14 by means of relief valve 38 and conduit 40. Thus, as the diameter of the winding strip of material on reel 34 increases, causing an increase in torque at motor 32 which causes an increase in pressure, throttle 46 responds to such increase of pressure, and throttle 46 will gradually close passageway 74 to meter a decreasing volume of fluid to motor 32, thereby decreasing the speed of motor 32 and maintaining a constant tension on the strip of material being wound on reel 34.

The curvature of metering valve 80 may be so chosen that for each position thereof, which corresponds to a given pressure or torque at motor 32, the size of opening, or the volume of fluid flow to the motor, is such that the product of motor pressure and volume is a constant. This relationship will produce constant tension on the strip material, neglecting losses at the reel and motor. Obviously, the curvature chosen may depart from this relationship as desired either to compensate for such losses or to produce any predetermined variation in strip tension as the reel diameter increases.

At the conclusion of the winding operation, valve 42 is shifted to block communication between conduit 18 and inlet port 20 and to connect conduits 18 and 44, thereby directing the full flow of fluid from pump 10 to tank 14, completely bypassing motor 32, unloading pump 10, and stopping motor 32.

It should be noted that valve 46 may be originally adjusted by adjustable screw 96 to originally conduct an amount of fluid to motor 32 at the start of the winding operation to create a maximum speed of the motor commensurate with the diameter of reel 34.

It should also be noted that the specially tapered construction of valve 80 and its position in passageway 74 will permit a predetermined decreasing amount of fluid volume to be delivered to motor 32 by pump 10 in response to any predetermined increase in pressure caused by an increase in torque at the motor 32. It should also be noted that, as the volume of fluid to motor 32 gradually decreases, thereby decreasing its speed as the winding strip of material increases in diameter on reel 34, a uniform constant tension may be maintained upon the winding material.

While the form of embodiment of the invention as herein disclosed constitutes a preferred form, it is to be understood that other forms might be adopted, all coming within the scope of the claims which follow. Although the invention has been shown to be suitable and adaptable for use in a hydraulic transmission for driving a reel comprising a fluid pump and motor driving the reel, it may be successfully applied in a similar hydraulic transmission for driving any load device where similar results are desired. Thus, the invention may be applied in a hydraulic transmission containing a fluid pump and motor driving a load device where it is desired to drive the load device at varying and progressive speeds and torques but at substantially constant horsepower, or where a desired relationship between the speed of the driven load device and torque of the same is required in spite of a continuously varying load resistance, or where the speed of the driven load device must change in a predetermined relationship in response to changes in torque.

Certain subject matter in common with the present invention is disclosed and claimed in a copending application of Warren Brown, Serial No. 569,826, filed December 26, 1944, title, Power transmission.

What is claimed is as follows:

1. In a hydraulic power transmission system for driving a reel and containing a constant pressure, variable volume fluid source and a fluid motor, the combination of a circuit for circulation of fluid through the source and motor, a flow regulating device comprising a first and second throttle valve in series in said circuit, the first throttle being responsive to and adjustable by the pressure at the motor whereby the first throttle tends to close in predetermined relationship to an increase of pressure at said motor and the second throttle valve being responsive to pressure changes ahead of and beyond the first throttle for maintaining a constant pressure drop across the first throttle.

2. In a hydraulic power transmission system for driving a load device at varying speeds and torques but at substantially constant horsepower and containing a constant pressure, variable volume fluid source and a fluid motor, the combination of a circuit for circulation of fluid through the source and motor, a flow regulating device comprising a first and second throttle valve in series in said circuit, the first throttle being responsive to and adjustable by the pressure at the motor whereby the first throttle tends to close in predetermined relationship to an increase of pressure at said motor and the second throttle valve being responsive to pressure changes ahead of and beyond the first throttle for maintaining a constant pressure drop across the first throttle.

3. In a hydraulic power transmission system for driving a load device at speeds which are varied in response to changes in torque and containing a constant pressure, variable volume fluid source and a fluid motor, the combination of a circuit for circulation of fluid through the source and motor, a flow regulating device comprising a first and second throttle valve in series in said circuit, the first throttle being responsive to and adjustable by the pressure at the motor whereby the first throttle tends to close in predetermined relationship to an increase of pressure at said motor and the second throttle valve being responsive to pressure changes ahead of and beyond the first throttle for maintaining a constant pressure drop across the first throttle.

4. In a hydraulic power transmission system for driving a load device at speeds which are varied in response to changes in torque and containing a constant pressure, variable volume fluid source and a fluid motor, the combination of a flow regulating device comprising an adjustable first throttle valve responsive to and adjustable by pressure changes at the motor whereby the throttle tends to close in predetermined relationship to increases of pressure at said motor, and a second throttle valve in series with the first throttle valve being responsive to pressure changes ahead of and beyond the first throttle for maintaining a constant pressure drop across the first throttle.

5. In a hydraulic power transmission system for driving a load device at speeds which are varied in response to changes in torque and containing a constant pressure, variable volume fluid source and a fluid motor, the combination of a circuit for circulation of fluid through the source and motor, a flow regulating device comprising a housing and having an inlet port connected to the source, an outlet port connected to the motor, and a control port also connected to the motor, a first and second throttle valve in series in said circuit, the first throttle valve being responsive to and adjustable by pressure increases at the control port whereby the first throttle tends to close in predetermined relationship to an increase of pressure at said motor, and the second throttle valve being responsive to pressure changes ahead of and beyond the outlet port for maintaining a constant pressure drop across the first throttle.

6. A flow regulating device for use in a hydraulic power system containing a constant pressure, variable volume fluid source and a fluid motor for driving a load device at speeds which are varied in response to changes in torque and comprising in combination a passage through which fluid is adapted to flow at a regulated rate, a throttle in said passage, means for adjusting said throttle automatically in response to pressure changes at the outlet to said passage to regulate the throttle opening as a function of such pressure, and means for maintaining a predetermined constant pressure drop across said throttle.

7. A flow regulating device for use in a hydraulic power system containing a constant pressure, variable volume fluid source and a fluid motor for driving a load device at speeds which are varied in response to changes in torque and comprising in combination a passage through which fluid is adapted to flow at a regulated rate, a throttle in said passage, means for adjusting said throttle automatically in response to pressure increases at the outlet to said passage whereby the throttle tends to close as a function of such pressure, and means for maintaining a predetermined constant pressure drop across said throttle.

8. A flow regulating device for use in a hydraulic power system containing a constant pressure, variable volume fluid source and a fluid motor for driving a load device at speeds which are varied in response to changes in torque and comprising in combination a passage through which fluid is adapted to flow at a regulated rate, a first throttle in said passage, means for adjusting said throttle automatically in response to pressure increases at the outlet to said passage whereby the throttle tends to close as a function of such pressure, and means comprising a second throttle valve in series with the first throttle valve for maintaining a predetermined constant pressure drop across said first throttle.

RALPH L. TWEEDALE.
JOSEPH J. GEORGE.

REFERENCES CITED

The following references are of record in the file of this patent:

UNITED STATES PATENTS

| Number | Name | Date |
|---|---|---|
| 2,082,473 | Tyler | June 1, 1937 |